US007609748B2

(12) United States Patent
Karlsson

(10) Patent No.: US 7,609,748 B2
(45) Date of Patent: Oct. 27, 2009

(54) METHOD, SYSTEM AND APPARATUS FOR MAXIMIZING A JAMMER'S TIME-ON-TARGET AND POWER-ON-TARGET

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 627 days.

(21) Appl. No.: 11/377,979

(22) Filed: Mar. 17, 2006

(65) Prior Publication Data

US 2006/0164283 A1 Jul. 27, 2006

Related U.S. Application Data

(63) Continuation-in-part of application No. 10/912,976, filed on Aug. 6, 2004, now Pat. No. 7,126,979.

(51) Int. Cl.
*H04B 1/707* (2006.01)
*G04K 3/00* (2006.01)

(52) U.S. Cl. .......................................... 375/141; 455/1

(58) Field of Classification Search ................. 375/140, 375/141, 219; 342/13–15; 455/1
See application file for complete search history.

(56) References Cited

U.S. PATENT DOCUMENTS

| | | | | |
|---|---|---|---|---|
| 3,670,333 | A * | 6/1972 | Winn | 342/14 |
| 4,017,856 | A * | 4/1977 | Wiegand | 342/15 |
| 5,128,679 | A * | 7/1992 | Moffat | 342/13 |
| 5,361,301 | A * | 11/1994 | Robertson et al. | 380/209 |
| 6,476,755 | B1 * | 11/2002 | Senio et al. | 342/15 |

* cited by examiner

*Primary Examiner*—Don N Vo

(57) ABSTRACT

A system and method of electronic signal jamming employ a jamming signal transmitter, an electronic signal tuner and a controller. During a first time period, the transmitter transmits a jamming signal in a first frequency segment comprising first frequencies. In a subsequent second time period, the transmitter stops transmitting, while the tuner collects signals in a second frequency segment comprising second frequencies. In a subsequent third time period, the transmitter resumes transmitting the jamming signal in the first frequency segment, while at a same time the controller processes the signals collected by the tuner in the second frequency segment and the tuner tunes to a third frequency segment comprising third frequencies. Then, before any further signals are collected by the tuner, the transmitter transmits the jamming signal in the second frequency segment responsive to the signals collected in the second frequency segment and processed by the controller.

6 Claims, 8 Drawing Sheets

FIGURE 3

| Number of Simultaneous Targets to be Jammed During An Attack Cycle | DDS Time Slot Allocation Attack Cycle 1 | DDS Time Slot Allocation Attack Cycle 2 | DDS Time Slot Allocation Attack Cycle 3 |
|---|---|---|---|
| 0 | ........... | ........... | ........... |
| 1 (F1) | F1 | F1 | F1 |
| 2 (F1, F2) | F1, F2 | F1, F2 | F1, F2 |
| 3 (F1, F2, F3) | F1, F2, F3 | F1, F2, F3 | F1, F2, F3 |
| 4+ (F1, F2, F3, F4...) | F1, F2, F3 | F4, F1, F2 | F3, F4, F1 |

METHOD, SYSTEM AND APPARATUS FOR MAXIMIZING A JAMMER'S TIME-ON-TARGET AND POWER-ON-TARGET

This application is a continuation-in-part of application Ser. No. 10/912,976, filed Aug. 6, 2004, now U.S. Pat. No. 7,126,979.

BACKGROUND OF THE INVENTION

1. Field of the Invention

This invention relates to advanced military grade communications jamming systems and, more specifically, to a Method, System and Apparatus for Maximizing a Jammer's Time on Target. This unique state-of-the-art invention will have use in any modern military organization that wants to achieve communications dominance and information superiority over any battlefield. The invention will add an essential, and much needed, communications and electronic warfare capability to any respective governments' national defense program.

2. Description of Related Art

Modern military grade communication systems today employ short, burst type transmissions that constantly cycle through a secret sequence of frequencies in order to prevent detection and jamming. Such systems are commonly known as frequency hoppers. Typically, these systems (both foreign and domestic) only transmit on a particular frequency for no more than a few milliseconds at the most. This creates a problem for those who want to detect and jam such transmissions as they happen so quickly. Practically, it is not feasible to simply "splash" the radio frequency spectrum with random noise in order to jam such transmissions. The reasons are that it requires an unpractical amount of power to apply sufficient RF energy to wash out all transmissions. In addition, there may be friendly transmissions that should not be jammed. Also, since the duration of the target transmissions is so short, it is not practical to have (for instance) a CPU that is programmed to evaluate signals, make a determination, and then command transmitters to jam. There is simply not enough time to engage the frequency hopping signals before they have moved on to a new frequency.

The jammer device described by U.S. patent application Ser. No. 10/912,976 is sometimes referred to in the Electronic Warfare industry as a "wideband reactive jammer", "surgical follower jammer," or a "surgical reactive jammer" because it has the ability to quickly find enemy signals and then apply energy right on targets so as to jam those enemy communication signals. It has this capability because it uses a wideband digital reception technique to instantaneously detect the presence of enemy signal energy. Once the enemy signals are detected, they are then immediately jammed by using fast direct digital synthesizers ("DSS's") to output RF energy right on those detected enemy signal frequencies.

The use of low cost frequency hopping radios, radio controlled improvised explosive devices (RCIED's), and low cost burst transmitters in military/non-military theaters is growing. These communications devices are perfect for insurgents or terrorist groups due to their low cost and availability. Thus, the need for a super fast reactive jamming technology in order to deny the operation of one or multiple devices occurring simultaneously is critical. This is especially true for U.S. and Coalition forces in theater today.

In order to address multiple targets appearing suddenly (and on any frequency), a jammer system must be fast enough to scan for and react to those new targets. In addition, the jammer system must have an efficient time-on-target technique to optimize the number of simultaneous targets it can be effective against by not wasting any time or energy. Furthermore, the jammer system must apply speed-up techniques in order to perform "look-throughs " (the time the jammer system stops jamming temporarily and scans for additional targets) more frequently. And finally, the jammer system must do this in real time.

FIG. 1 is a prior art drawing that depicts the conventional surgical reactive jamming system's attack cycle process 200 (i.e. the repetitive attack cycles of a surgical reactive jammer). For the first attack cycle 200 period, the jammer first tunes to frequency range segment 1. The RX input is then turned on and the first "collection period" (for segment 1 data) commences. The first collection period is completed by turning off the tuner (tuners are synonymous with HF/VHF/UHF receivers) input. The jamming system then processes the received segment 1 data and turns on the jammer TX output on the desired frequency for a "TX Dwell Period", and then stops jamming to do a quick "look-through" to receive and analyze the RF spectrum to see if there are additional targets appearing and also to determine if the earlier detected targets are still transmitting. The combination of TX Dwell, Collection period, and the analysis process is one single "attack cycle". This cycle is repeated over and over again until the jammer is turned off. The problem with this prior art process and method is that during the tuning, collection, and processing periods, active jamming is not occurring. This is not an optimal approach to increasing time-on-target.

What is needed therefore in order to feasibly maximize a jammer's time-on-target (that can be radiating on any frequency) as efficiently as possible, is a System that has the following attributes: 1) The abilities stated in the aforementioned U.S. patent application to do extremely fast wideband scanning for signal energy across wide ranges of the RF spectrum; 2) The real time ability to do pipelining of System functions; 3) The real time ability to jam one or more targets within each TX Dwell period; and 4) The real time ability to calculate the most optimal DDS firing solutions, given the targets presently detected. The sum of these system invention capabilities is unique.

In addition to being applied for military tactical operations, such a technology invention would be extremely useful to the Department of Homeland Security, the Secret Service, the Central Intelligence Agency, etc. as the need to disrupt sudden, multiple enemy communications, on any frequency, has always been desired. Furthermore, with the recent threat of Radio Controlled Improvised Explosive Device type weaponry this invention is even more required today.

SUMMARY OF THE INVENTION

In light of the aforementioned problems associated with the prior devices and methods used by today's military organizations, it is an object of the present invention to provide a Method, System and Apparatus for Maximizing a Jammer's Time on Target and Power on Target.

It is an object of the present invention to provide an enhanced and more efficient jamming system that can address multiple simultaneous targets, such that the time-on-targets are maximized given a fixed amount of available system power. Such an enhanced surgical reactive jamming system will then allow users to more intelligently and efficiently address all targets that suddenly appear, without having to replicate more jamming system hardware which drastically raises the total overall cost, size, and weight. These enhancements for surgical reactive jammers are very applicable to jam multiple sudden transmissions. Examples of such sudden, frequency agile targets are multiple military grade frequency hopping nets (commonly known as "hoppers") and multiple radio controlled improvised explosive devices (known as "RCIED's").

The preferred system needs to have the ability to do fast wideband scanning of the RF spectrum looking for RF signals such as those emitted by frequency hoppers and RCIED's, and then jamming them instantaneously. Secondly, the preferred system needs to have the ability to pipeline the major functions so that more time can be spent putting energy on target (extends the TX Dwell Period effectively by allowing the jammer more time to apply energy, as opposed to spending time on calculations and re-tuning). Third, the preferred system needs to have the ability to change the output jamming frequencies midstream (mid TX Dwell Period), so as to further maximize time-on-target. Fourth and finally, the preferred system needs to have the ability to perform a real time evaluation of the DDS firing solutions such that the signals going to multiple DDS's in a jammer system can be multiplexed in a fashion that maximizes the utilization of the available jammer transmitter power.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 3 depicts the preferred DDS firing solution lookup table process of the present invention;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method, System and Apparatus for Maximizing a Jammer's Time and power on multiple Targets.

"Time-on-target" is defined as the amount of time a jamming signal is applied on an enemy transmission, expressed as a percentage of the total enemy transmission's time. The present invention provides enhanced efficiency by maximizing a surgical reactive jammer's time-on-target through the three major methods. Each method in itself enhances the time-in-target independent of the other two. The invention of this patent application employs all three unique methods. One of these methods is a set of algorithms for pipelining and algorithm speed optimization. Another method is the use of a fast DDS lookup table to determine the most optimal "firing solution" of the digital synthesizers to attack multiple targets. The last method is the extremely fast enactment of newly calculated firing solutions midstream in every TX dwell period. Basically, it applies the new solution instantly without waiting for the next attack cycle, which is how it is done today in prior art systems.

Figure 1:
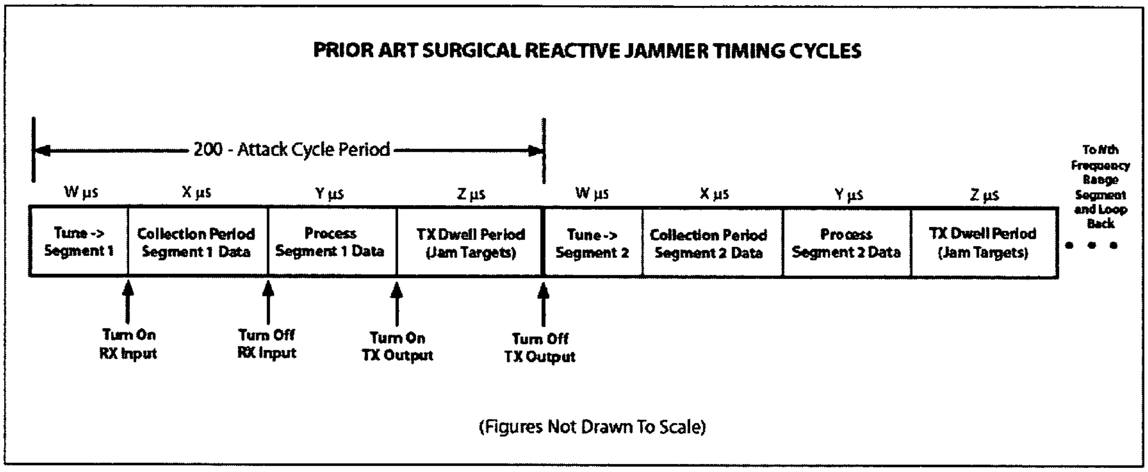
FIGURE 1 PRIOR ART
FIG. 1 depicts the attack cycle process of a conventional prior art jamming system.
Figure 2:
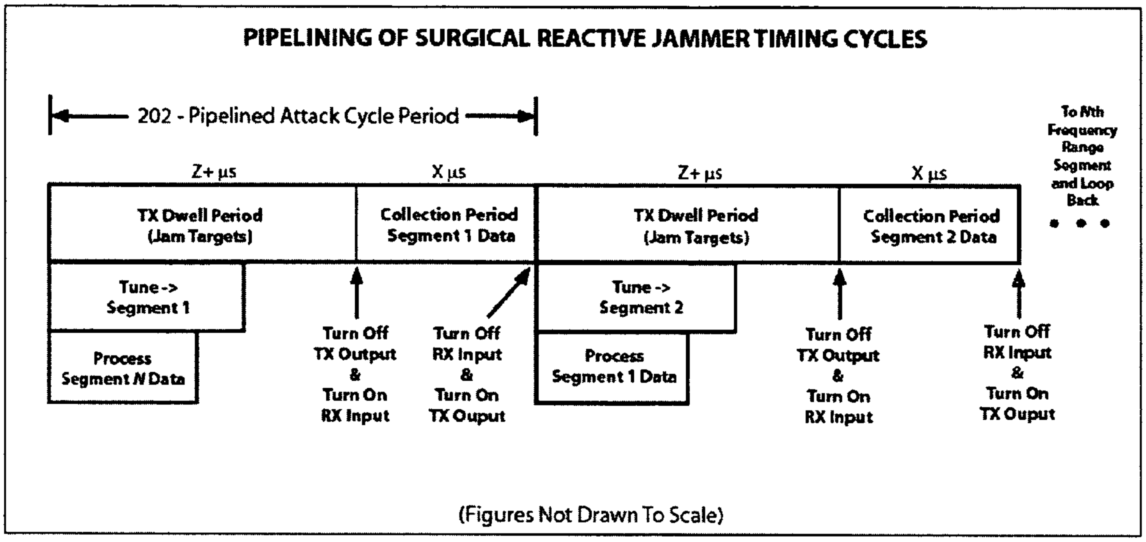
FIG. 2 depicts the pipelined attack cycle process of the system and method of the present invention.

The present invention can initially be understood by the side by side comparison of FIGS. 1 and 2. FIG. 1 depicts a standard prior art attack cycle process. The linear process of tuning, detecting enemy signals, processing data, and then subsequently jamming them is a well known method. But FIG. 2 depicts a preferred pipelined attack cycle approach employed by the present invention. This "Pipelining" of the system means that functions are performed in parallel in time to optimize speed of jammer reaction. For the first attack cycle period, the jammer already has a firing solution from a previous segment and is programmed to jam (TX dwell period). During this TX dwell period, the jammer in parallel retunes the tuner so that it is ready by the time the Collection period starts (the process of gathering new data on a different portion of the RF spectrum looking for new targets). In addition to that, the data that was collected in the previous attack cycle is calculated and a new firing solution is obtained. This new (and more up to date) firing solution is then ready to be applied. At the end of the TX dwell period the Collection period starts. Then the cycle repeats over and over again.

As should be apparent, the critical distinction between this method and that of the prior systems is that the method of the present invention sets the cycle generator such that the tuner is tuned to the next frequency segment -during- when the jammer is outputting the jamming signals. In addition, the processing of what the previous look-through period detected is analyzed, and the DDS firing solution is determined also at the same time. This pipelining of the various major processes is one of the unique techniques that this algorithm invention employs. A far more detailed description of the entire algorithm process of this invention is outlined in the discussion of FIGS. 4 and 5.

Now turning to FIG. 3, we can examine how the direct digital synthesizer (DSS) firing solutions are optimized during each and every TX dwell period to further maximize the time-on-target of the present system. This is the second, independent method by which the invention maximizes time-on-target and power on target. FIG. 3 shows an example decision table of the invention showing how the most efficient DDS firing solutions are determined to maximize time-on-target, each attack cycle. The system goes through the list of predetermined criterion with the signals detected or predetermined and then makes the proper DDS firing solution based upon the number of simultaneous targets, and the available power of the system. This is the most efficient method to automatically determine the best DDS firing solution, by look up table. This process is repeated for every single Attack Cycle 202.

In this example FIG. 3 drawing, there is one DDS available to be used for jamming. There can be multiple DDS's in any system though, but FIG. 3 is presented with only one DDS for simplicity. The number of targets that are detected during each Collection Period, and determined to be jammed, is represented in the left column. In the DDS columns, are representative drawings of the TX Dwell Period outputted from the DDS over three successive attack cycles. If the TX Dwell Period is broken up into several boxes, each box represents jamming on a target frequency (F1, F2, F3, F4 . . . ) for a period of time. This example assumes that the maximum number of "timing slots" during a single TX Dwell Period is three. In that case, the algorithm will optimize and time-share the jamming of targets into "time slots". This intelligent technique of time-slotting the jammer's energy over the various target frequencies through a programmable high speed lookup table greatly enhances the respective time-on-targets. If we now turn to FIG. 4, we can examine the pipelined jamming method in even greater detail.

Figure 4:
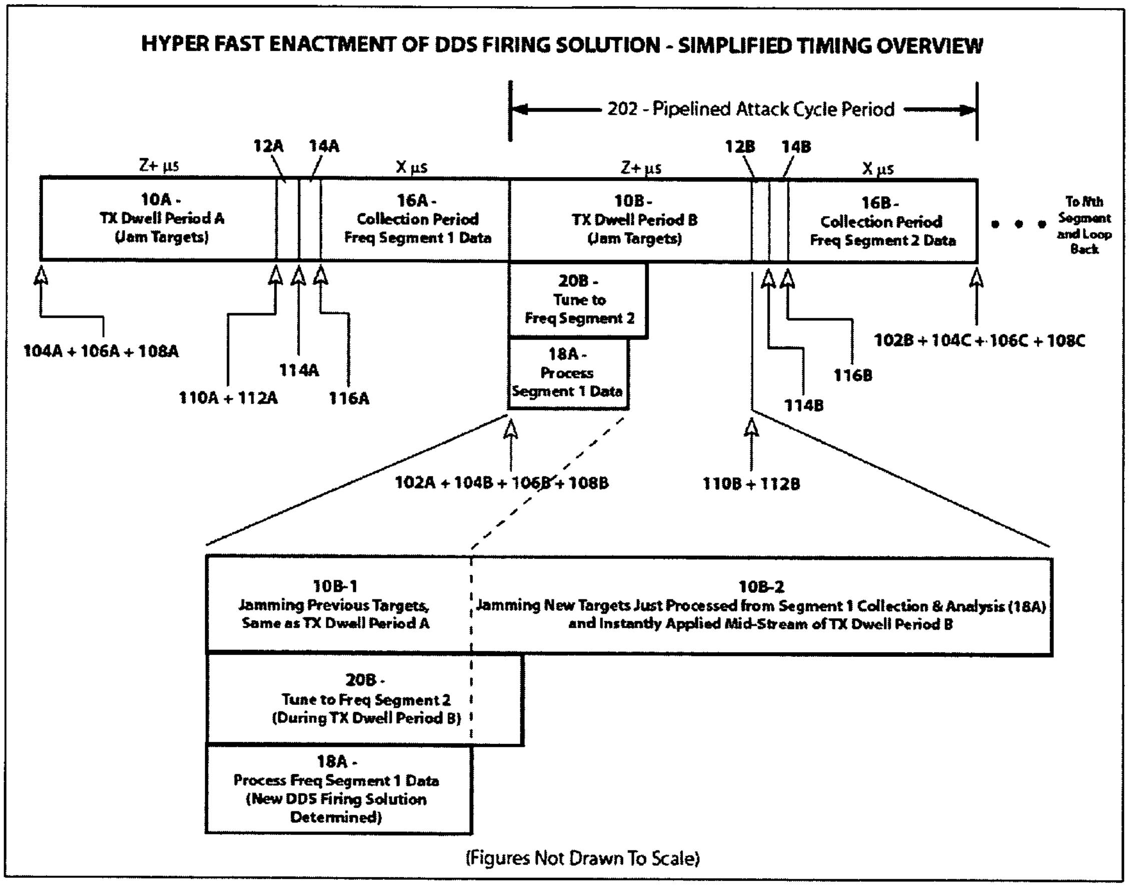
FIG. 4 depicts the pipelined attack cycle process of the present invention in even greater detail including the hyper fast, midstream enactment of the DDS firing solution.

As mentioned, FIG. 4 further depicts the method of FIG. 2 in greater detail. It outlines the last major method of this invention to maximize time-on-target.

This method implements the DDS firing solution as fast as theoretically possible, thereby also increasing the time-on-target. After signals are detected in a Collection Period 16A, the jammer must process the data 18A in order to determine what the jamming firing solution is. Once determined, the jammer will immediately stop jamming on the previous target(s) and will instead jam on the new targets. This process is done extremely fast due to the fact that direct digital synthesizers are used which can switch frequencies in less than a microsecond. Such a speed-up process increases the effective time-on-target as well.

As should be clear from the drawing, the TX dwell periods are actually broken up (potentially) into transmissions on two different sets of frequencies based on previous segment data, and segment 1 data. While the first portion of TX dwell period 10B-1 is ongoing, the tuner are being tuned to new segment 2. In addition, the segment 1 data is being processed 18A. Once 18A is complete, a new DDS firing solution is output and the DDS's can be instantly retasked with the newer more updated programming. Thus, the TX dwell period 10B is actually broken up into 10B-I and 10B-2. Where the 10B-1 period is for the previous DDS firing solution, and 10B-2 is for the new DDS firing solution calculated from processing stage 18A. In this way, the invention does not have to wait until that particular cycle is complete to enact the new programming. The new programming can occur midstream which enhances time-on-target.

To describe the process of FIG. 4, the jamming (TX dwell) period 10A begins with the turning on of the TX PIN switch 104A, the turning on of the PA 106A, and the triggering of the TX dwell period 108A. It is assumed, for simplicity, that the jamming of targets is already known from the previous attack cycle. For further simplicity, the tuning to segment 1 and the processing of segment N (previous segment) pipelined steps are not shown on this drawing, they are only shown during the next pipelined attack cycle 202.

Continuing forward, at the completion of TX dwell period 10A, the PA output is turned off 110A, and the TX PIN switch turned off 112A. Then the RX input is turned on 114A. And then finally the collection period is triggered 116A. The collection period 16A for the segment 1 data then commences (as will become clear, the receiving system has already been tuned to segment 1). Upon completion of the collection period 16A, the tuner input is turned off 102A, the TX PIN switch turned on 104B, the PA turned on 106B, and the next TX dwell period is triggered 108B.

While the data received during segment 1 collection period 16A is being processed 18A, the tuner is/are being tuned 20B to the next frequency range segment of interest (segment 2). Once segment 1 data processing period 18A is complete (and the data is processed), the transmitter(s), already jamming at the frequency from the previous TX dwell period are rapidly reprogrammed to the new jamming frequency in the middle of the new TX dwell period 10B.

Repeating the previous steps, after the TX dwell period 10B is complete, the TX output is then turned off 10B, the TX PIN switch turned off 112B. Then nearly immediately the RX input is nearly immediately turned on 114B, the collection period is triggered 116B, after which the collection period for segment 2 data 16B is commenced. This once again leads to the RX input tuned off 102B, the TX PIN switch turned on 104C, the PA turned on 106C, and the next TX dwell period is triggered 108C, and followed virtually immediately by the TX output re-commencing 10C.

If we finally turn to FIGS. 5A-5D, we can examine the flow chart detailing the method executed by the present invention. This diagram shows the decision tree process throughout one single Attack Cycle series (where the jammer moves from tuner segment/band to tuner segment/band before starting the process over). A "segment" or "frequency band" is one stare bandwidth of the front end tuner. An attack cycle is the process of the jammer applying energy, switching, and then opening the tuner to do a "look through" to determine what target signals have appeared.

Each cell of the flow diagram indicates the action of the jammer as it goes through a single attack cycle series. The process starts at event A on FIG. 5A and goes through several sub-stages before returning again to A at termination of the process chart in FIG. 5D.

Figure 5A:
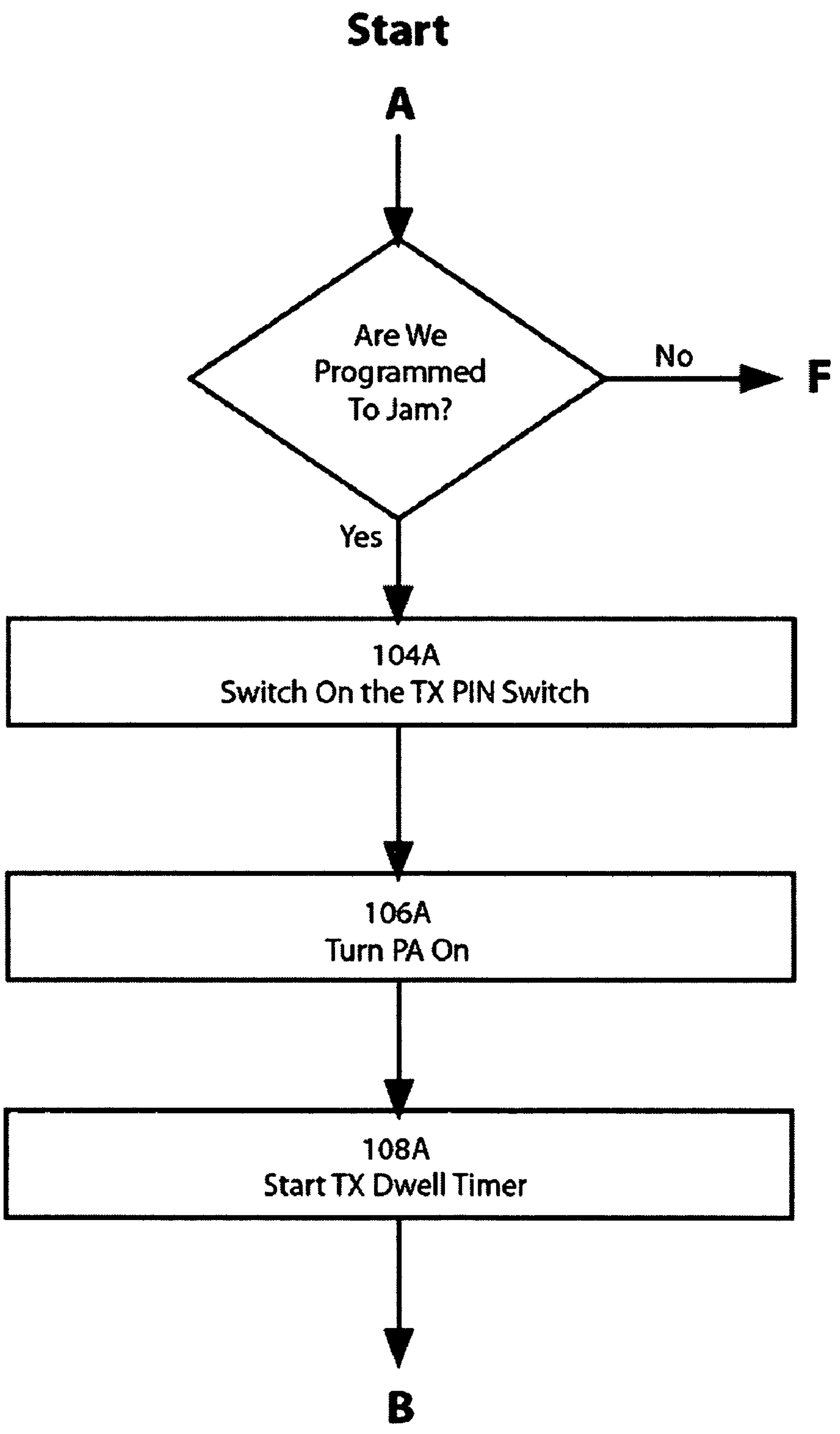
FIGS. 5A-5D depict a detailed flowchart of the operational method of the present invention for each attack cycle.
Figure 5B:
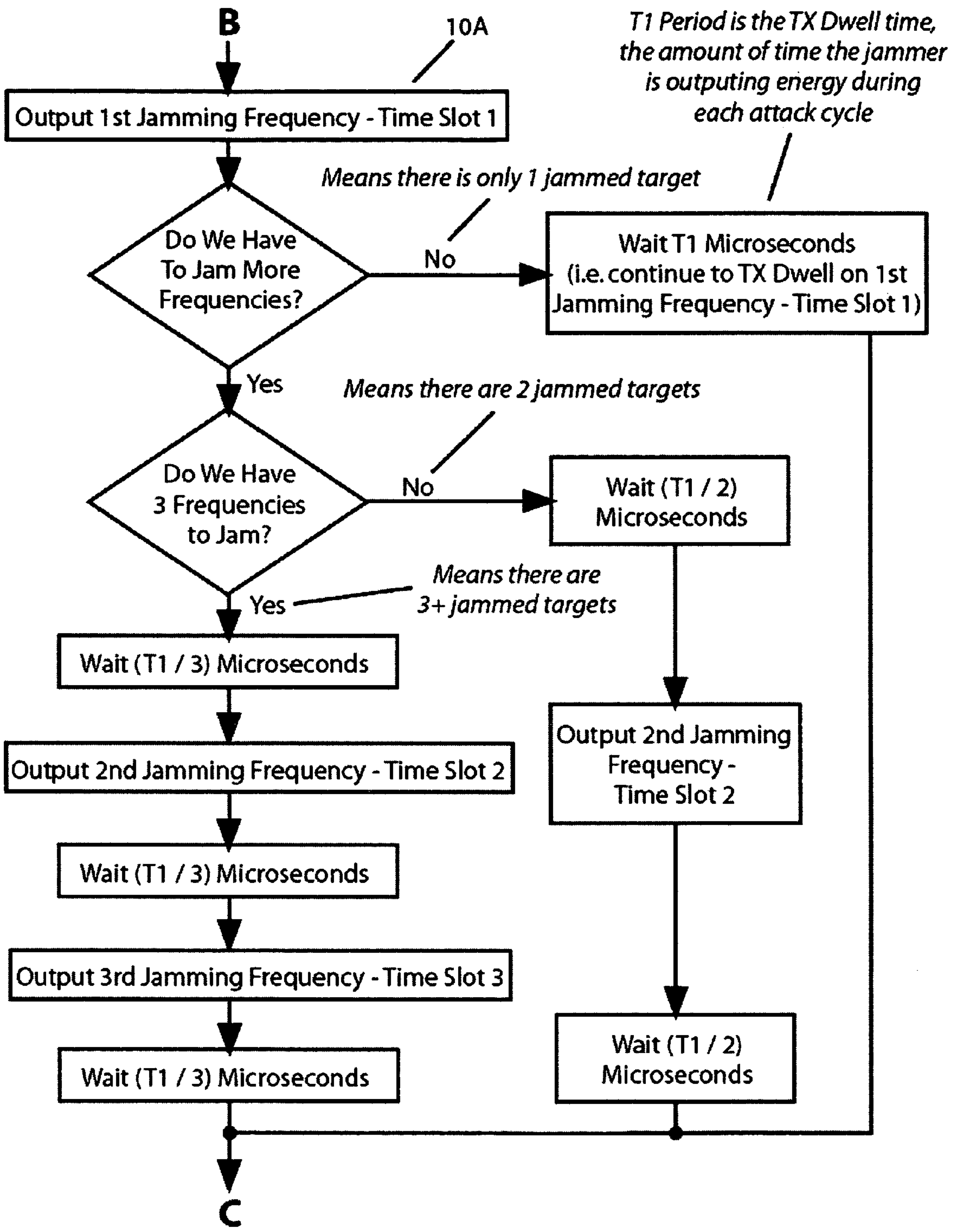
Figure 5C:
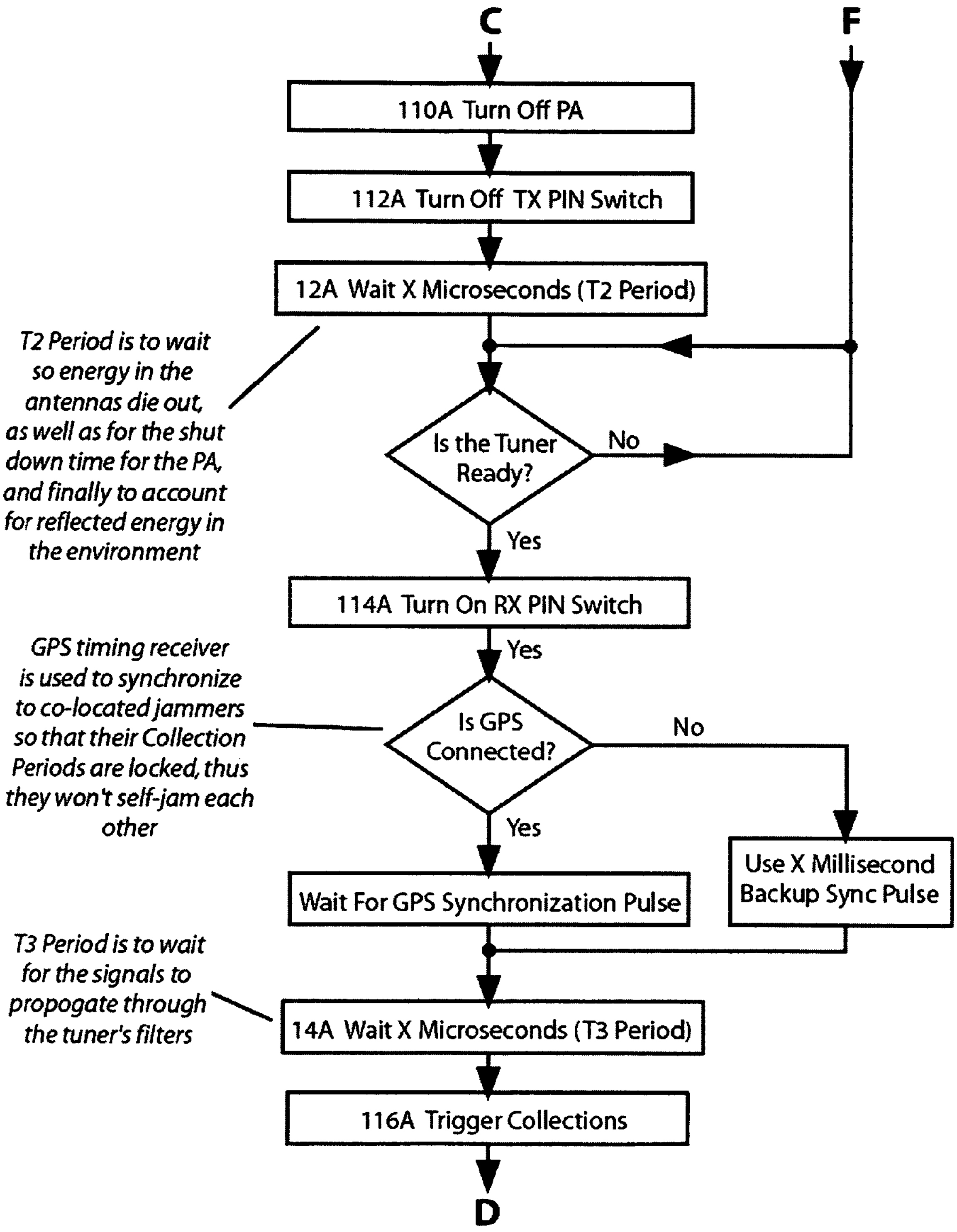
Figure 5D:
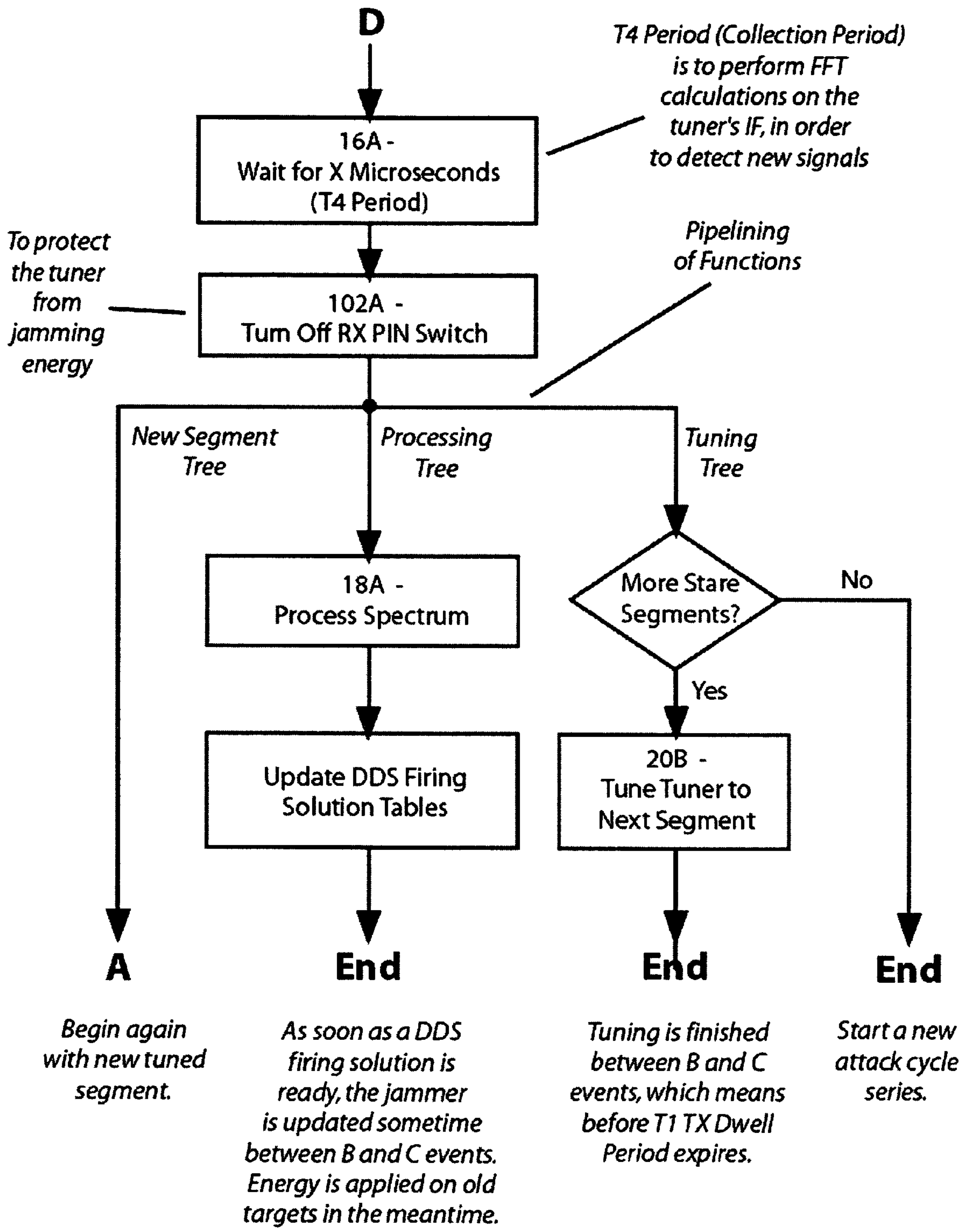

If programmed to jam, the TX PIN switch is switched on 104A; if not programmed to jam, the system will jump to event F (FIG. 5C). At nearly the same time, the power amplifier will turn on 106A, and the TX dwell timer will be started 108A.

FIG. 5B depicts how then the TX dwell period 10A begins on the first jamming frequency. If more frequencies do not have to be jammed with the same power amplifier, it means that only a single frequency will be jammed, and there will be a wait period of T1 microseconds (the transmit dwell time) while jamming continues on that first frequency.

But if there is more than one frequency to jam, but less than three frequencies, the system will wait T1/2 microseconds (i.e. jamming on the first frequency for the wait time one half the T1 period), and then switch to output/transmit on the second transmitting frequency and will wait another T1/2 microseconds (i.e jamming on the second frequency during this second wait time).

If there are three frequencies to jam, the system will wait T1/3 microseconds (i.e. transmitting on the first jamming frequency for one third the T1 period), will switch to the second jamming frequency and wait for another T1/3 microseconds (transmitting on the second jamming frequency), and then finally switch to the third jamming frequency and wait the last T1/3 microseconds. Event C is the completion of the TX dwell period; FIG. 5C describes the ensuing steps.

First, the power amplifier is turned off 110A and the TX PIN switch is also turned off 112A. The system will wait for period of T2 microseconds 22A, until the PA has powered down and all reflected energy from the immediate surrounding terrain has died out. When the tuner is ready, the RX PIN switch is turned on 114A. If the system is not equipped with GPS, then a backup pulse is used to substitute for the timing interval that is normally received from the GPS. If systems are equipped with GPS, the system will await for a GPS synchronization pulse so that jamming systems in close proximity to one another will cooperatively synchronize their respective collection periods to prevent them from jamming each other (since all of the collection periods are of the same microsecond length).

Next, the system waits for a period of T3 microseconds 14A to allow the received signals to propagate through the tuner's filters, after which data collection is triggered 116A. Event D is the commencement of the collection period and continues to be described in FIG. 5D.

While in the collection period, the system will wait for period T4 microseconds 16A, a period of time adequate to allow the system to perform the necessary FFT calculations to detect and identify new arriving signals. The RX PIN switch is then turned off 102A to protect the jammer's tuner from saturation due to the outgoing jamming signal. This ends the pipelined attack cycle 202 and the process begins again with events 104B,106B and 108B. The spectrum data just received is processed 18A while the tuner is tuned 20B to the next frequency segment. Both of these events occur while the jammer is in the next TX dwell period 10B.

Again, this entire process is depicted in FIG. 4 which pictorially shows the step by step processes and when they occur.

DIAGRAM REFERENCE NUMERALS

10A T1 Period (TX dwell—attack cycle A)

10B T1 Period (TX dwell—attack cycle B)

10B-1 Attack cycle B TX dwell using previous attack cycle's DDS firing solution

10B-2 Attack cycle B TX dwell using updated DDS firing solution

12A T2 Period (wait period for PA to shut down—attack cycle A)

12B T2 Period (wait period for PA to shut down—attack cycle B)

14A T3 Period (wait period for signal propagation—attack cycle A)

14B T3 Period (wait period for signal propagation—attack cycle B)

16A T4 Period (collection period—attack cycle A)

16B T4 Period (collection period—attack cycle B)

18A Process Segment 1 Data taken during 16A

20B Tune to Frequency Segment 2, during process 10B

102A Turn OFF the RX PIN switch—attack cycle A

102B Turn OFF the RX PIN switch—attack cycle B

104A Turn ON the TX PIN switch—attack cycle A

104B Turn ON the TX PIN switch—attack cycle B

106A Turn ON the PA—attack cycle A

106B Turn ON the PA—attack cycle B

108A Start TX Dwell Timer—attack cycle A

108B Start TX Dwell Timer—attack cycle B

110A Turn OFF the PA—attack cycle A

110B Turn OFF the PA—attack cycle B

112A Turn OFF the TX PIN switch—attack cycle A

112B Turn OFF the TX PIN switch—attack cycle B

114A Turn ON the RX PIN switch—attack cycle A

114B Turn ON the RX PIN switch—attack cycle B

116A Trigger Collections—attack cycle A

116B Trigger Collections—attack cycle B

200 Prior Art (Non-Pipelined) Attack Cycle

202 Pipelined Attack Cycle

Operational Summary

For surgical reaction jammers, the key is to reduce the attack cycle to as short a possible time. This is because by making the attack cycle short, the jammer can scan and pick up targets in other areas of the spectrum much faster. The heart of all jammer systems is how fast it can pick up targets and then jam on them. In addition, the governing criterion is how much power is available to feasibly jam all the targets. In real world systems, the power available is finite and thus some level of time-sharing of targets has to occur. Otherwise, one would simply just apply as many power amplifier chains as possible to account for the presence of multiple targets. But this is not feasible in the real world. Thus, the algorithm of this invention aims to do several things in order to solve these issues, it optimizes the process of jamming, it optimizes the firing solution by using predetermined time-sharing of multiple targets under certain scenarios, and finally it optimizes the speed with which that firing solution is actually enacted.

There are several timers in the jamming cycle generator that are adjustable, and regulate exactly when (to the precise microsecond), that each process should occur so that the entire process is as efficient as possible. These various steps are outlined in detail in FIGS. 5A-5D. The basic timers (T1 through T4 periods) are explained as well in those figures.

First, the algorithm pipelines the jamming process so that an attack cycle is reduced to its minimum length of time. The tuning of the tuner is done in parallel while the jammer is in its TX Dwell Period. In addition, processing of data is done in parallel. The timing of these actions must be precisely coordinated so that the system is synchronized. The cycle generator function, described by the previous patent application Ser. No. 10/912,976, performs these functions with microsecond timing accuracy.

Another way that the invention enhances efficiency and time-on-target is to have the jammer automatically apply the most optimal DDS firing solution based upon the number of targets encountered. It does so by the jammer employing a DDS firing solution lookup table. For surgical reactive jammers with more than one DDS, this innovation is critical to enhance the efficiency of the jammer. If, for example, 3 targets are detected simultaneously, the jammer will go to this truth table and instantly apply maximum power on an optimized time-sharing basis between the available DDS's and transmitters. It does so knowing the power capabilities of the system. Thus, it will not overextend its available primary power subsystem. Essentially this is a fast implementation of time-sharing and power-sharing of the available transmit assets in the jammer system.

If additional targets appear, then the jammer is programmed to rotate through the various signals given the available PA power that can be applied, as shown in the example of FIG. 3. Thus, the time-sharing is optimized so that as many targets as possible are hit with the available power. This optimization table is installed inside the dedicated hardware logic of the jammer. It must be there to handle the microsecond timing of the entire jammer.

The final way that the invention enhances efficiency and time-on-target is to speed with which a DDS firing solution is applied. Jamming signals can be adjusted on the fly, midstream while in a TX Dwell Period. As the reader can see by FIG. 2, the pipelining of the process now allows the system to evaluate what signals were detected on the previous Collection Period. While this process is calculating, the jammer will apply energy exactly on the last known frequencies of the enemy targets. This maximizes the time-on-target by making the assumption that the enemy signals are still there.

Once the Collection Period processing is complete, and the DDS firing solutions are determined, the algorithm of this invention will instantly command the DDS's to their new firing solution. Thus, the jamming signals may or may not be changed mid TX Dwell Period. This process is unique and provides the user with the maximum theoretical time-on-target capabilities, giving maximum utilization of the available system power. Again, this invention aims to improve the efficiency and speed of reactive jamming given real world constraints.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electronic signal jamming system, comprising:

a jamming signal transmitter;

an electronic signal tuner;

a jamming system controller for processing electronic signals collected by said electronic signal tuner, wherein during a first time period, the jamming signal transmitter transmits a jamming signal in a first frequency segment comprising first frequencies, wherein during a second time period subsequent to the first time period, the jamming signal transmitter stops transmitting, while the electronic signal tuner collects signals in a second frequency segment comprising second frequencies different from the first frequencies, and wherein during a third time period subsequent to the second time period, the jamming signal transmitter resumes transmitting the jamming signal in the first frequency segment, while at a same time the controller processes the signals collected during the second time period in the second frequency segment by the electronic signal tuner, and then, before any further signals are collected by the electronic signal tuner, the jamming signal transmitter transmits the jamming signal in the second frequency segment responsive to the signals collected during the second time period in the second frequency segment by the electronic signal tuner and processed by the controller.

2. The signal jamming system of claim 1, wherein said electronic signal tuner tunes to a third frequency segment comprising third frequencies different from the second frequencies at the same time that the controller processes the signals collected during the second time period in the second frequency segment by the electronic signal tuner.

3. A method of operating an electronic signal jamming system, the method comprising:

during a first time period, transmitting with a jamming signal transmitter a jamming signal in a first frequency segment comprising first frequencies;

during a second time period subsequent to the first time period, collecting with an electronic signal tuner electronic emissions in a second frequency segment comprising second frequencies different from the first frequency; and during a third time period subsequent to the second time period, transmitting with the jamming signal transmitter said jamming signal in said first frequency segment, while at a same time a controller processes the electronic emissions collected during the second time period in the second frequency segment by the electronic signal tuner, and then, before any further electronic emissions are collected by the electronic signal tuner, transmitting the jamming signal in the second frequency segment responsive to the electronic emissions collected during the second time period in the second frequency segment by the electronic signal tuner and processed by the controllers.

4. The method of claim 3, further comprising tuning the electronic signal tuner to a third frequency segment comprising third frequencies different from the second frequencies, said tuning being executed during the third time period in parallel with said with the jamming signal transmitter transmitting said jamming signal.

5. The method of claim 3, wherein said jamming signal transmitter transmits the jamming signal in said second frequency segment virtually immediately upon completion of said controller processing the electronic emissions collected during the second time period in the second frequency segment.

6. The method of claim 3, wherein said jamming signal transmitter transmitting the jamming signal in said first frequency segment transitions into transmitting the jamming signal in said second frequency segment virtually without pause.

* * * * *

UNITED STATES PATENT AND TRADEMARK OFFICE

CERTIFICATE OF CORRECTION

PATENT NO. : 7,609,748 B2
APPLICATION NO. : 11/377979
DATED : October 27, 2009
INVENTOR(S) : Lars Karlsson It is certified that error appears in the above-identified patent and that said Letters Patent is hereby corrected as shown below:

In column 10, line 4-5, in Claim 3, delete “frequency;” and insert -- frequencies; --, therefor.

In column 10, line 17-18, in Claim 3, delete “controllers.” and insert -- controller. --, therefor.

Signed and Sealed this

Nineteenth Day of January, 2010

David J. Kappos
*Director of the United States Patent and Trademark Office*